United States Patent
Nir et al.

(10) Patent No.: US 10,384,959 B2
(45) Date of Patent: Aug. 20, 2019

(54) METHOD OF MAKING AND USING GRANULATED MICELLE-CLAY COMPLEXES FOR REMOVAL OF POLLUTANTS FROM WATER

(71) Applicants: Shlomo Nir, Mazkeret Batya (IL); Marklen Ryskin, Yavne (IL)

(72) Inventors: Shlomo Nir, Mazkeret Batya (IL); Marklen Ryskin, Yavne (IL)

(*) Notice: Subject to any disclaimer, the term of this patent is extended or adjusted under 35 U.S.C. 154(b) by 384 days.

(21) Appl. No.: 14/790,440

(22) Filed: Jul. 2, 2015

(65) Prior Publication Data
US 2016/0002068 A1 Jan. 7, 2016

Related U.S. Application Data

(60) Provisional application No. 62/020,463, filed on Jul. 3, 2014.

(51) Int. Cl.
| | | |
|---|---|---|
| *C02F 1/28* | (2006.01) | |
| *B01J 20/22* | (2006.01) | |
| *B01J 20/20* | (2006.01) | |
| *B01J 20/12* | (2006.01) | |
| *B01J 20/28* | (2006.01) | |

(Continued)

(52) U.S. Cl.
CPC .............. *C02F 1/288* (2013.01); *B01J 20/12* (2013.01); *B01J 20/20* (2013.01); *B01J 20/22* (2013.01); *B01J 20/28004* (2013.01); *B01J 20/3028* (2013.01); *B01J 20/3287* (2013.01); *C02F 1/281* (2013.01); *C02F 1/283* (2013.01); *C02F 1/285* (2013.01); *C02F 1/683* (2013.01); *C02F 2101/12* (2013.01); *C02F 2101/18* (2013.01); *C02F 2101/22* (2013.01);
(Continued)

(58) Field of Classification Search
None
See application file for complete search history.

(56) References Cited

U.S. PATENT DOCUMENTS 3,084,104 A * 4/1963 Tuerck .................... A61K 9/16
264/117
3,853,753 A * 12/1974 Jones ................. B01D 17/0202
210/708

(Continued)

FOREIGN PATENT DOCUMENTS

EP         1851173 B1     11/2013

OTHER PUBLICATIONS

Carter, A. D. "Herbicide movement in soils: principles, pathways and processes" Weed Res., 40, 113-122 (2000).
(Continued)

*Primary Examiner* — Chester T Barry
(74) *Attorney, Agent, or Firm* — Browdy and Neimark, PLLC

(57) ABSTRACT

The present invention pertains to a complex comprising micelles of organic cation adsorbed on clay in granulated form, to a method for obtaining an aqueous solution substantially free of organic, inorganic anionic pollutants, or microorganisms present therein, comprising contacting the aqueous solution containing said pollutants with such a complex and to a system for obtaining an aqueous solution substantially free of organic, inorganic anionic pollutants, or microorganisms present therein employing the granulated complex.

23 Claims, 2 Drawing Sheets

(51) Int. Cl.
  B01J 20/32 (2006.01)
  B01J 20/30 (2006.01)
  *C02F 101/12* (2006.01)
  *C02F 101/30* (2006.01)
  *C02F 1/68* (2006.01)
  *C02F 101/18* (2006.01)
  *C02F 101/22* (2006.01)

(52) U.S. Cl.
  CPC .... *C02F 2101/30* (2013.01); *C02F 2101/306* (2013.01); *C02F 2303/04* (2013.01)

(56) References Cited

U.S. PATENT DOCUMENTS

| | | | | |
|---|---|---|---|---|
| 4,321,157 | A | 3/1982 | Harris et al. | |
| 5,273,758 | A * | 12/1993 | Royce | A61K 9/2031 424/464 |
| 6,132,623 | A * | 10/2000 | Nikolaidis | B09C 1/002 210/719 |
| 6,242,663 | B1 * | 6/2001 | Ponder | B09C 1/002 588/315 |
| 8,361,325 | B2 | 1/2013 | Nir | |
| 9,265,812 | B2 * | 2/2016 | Mamluk | A61K 9/0031 |
| 2005/0051493 | A1 * | 3/2005 | Hensman | C02F 1/281 210/688 |
| 2006/0075894 | A1 * | 4/2006 | Jin | B01D 53/02 95/90 |
| 2009/0114599 | A1 * | 5/2009 | Nir | B01J 20/12 210/679 |
| 2010/0029897 | A1 * | 2/2010 | Connor | A61K 31/13 528/422 |
| 2015/0054184 | A1 * | 2/2015 | Chen | C04B 35/51 264/0.5 |
| 2015/0094327 | A1 * | 4/2015 | Bushman | C07D 471/04 514/300 |
| 2015/0152242 | A1 * | 6/2015 | Chen | C08K 9/04 524/236 |
| 2015/0331151 | A1 * | 11/2015 | Fukuda | G02B 1/04 428/1.1 |

OTHER PUBLICATIONS

Motzer, W. E. "Perchlorate: Problems, Detection, and Solutions" Environmental Forensics. 2, 301-311 (2001).

Urbansky, E. T. "Perchlorate as an Environmental Contaminant" Environ. Sci. & Pollut. Res., 9, 187-192. (2002).

Lagaly, G. "Surface and Interlayer reactions: Bentonites as Adsorbents" In: Proc. of the 10th International Clay ConferencSurface and interlayer reactions. Churchman, G. J., Fitzpatrick, R. W. & Egglegton, R. A. Eds.; CSIRO Pub.: Melbourne, Australia, 137-144 (1995).

Xu, S. et al "Use of Organoclays in Pollution Abatement" A. Adv. Agron. 59, 25-62 (1997).

Mishael, Y. G. et al "Sulfometuron Incorporation in Cationic Micelles Absorbed on Montmorillonite" J. Agric. Food Chem. 50, 2856-2863 (2002).

Polubesova et al "Water Purification from Organic Pollutants by Optimized Micelle-Clay Systems" Environ. Sci. Technol. 39, 2343-2348 (2005).

Polubesova et al T.; "Water remediation by micelle-clay system: Case study for tetracycline and sulfonamide antibiotics", Water Res. 40, 2369-2374 (2006).

Hwang et al "Risk of Specific Birth Defects in Relation to Chlorination and the Amount of Natural Organic Matter in the Water supply" Amer J Epidemiol. 156, 374-382 (2002).

Knappett et al "Transport and retention of a bacteriophage and microspheres in saturated, angular porous media: Effects of ionic strength and grain size" Wat Res. 42:4368-4378 (2008).

Nir, S.; "Simulation of adsorption and flow of pollutants in a column filter: Application to micelle-montmorillonite mixtures with sand".; Appl. Clay Sci. 67-68, 134-140 (2012).

Jaynes, W.F., Boyd, S.A., Clay mineral type and organic-compound sorption by hexadecyltrimethylammonium-exchanged clays. Soil Sci. Soc. Am. J. 55, 43-49 (1991).

Mortland, M.M., Clay organic complexes and interactions. Adv. Agron. 22, 75-117 (1970).

Nir, S., Brook, I., Anavi, Y., Ryskin, M., Ben-Ari, J., Shveky-Huterer, R., Etkin, H., Zadaka-Amir, D., Shuali, U., Water purification from perchlorate by a micelle-clay complex: Laboratory and pilot experiments. Appl. Clay Sci., 114, 151-156 (2015).

* cited by examiner

1 – Temperature – 40-45°C
2 – Temperature – 22-24°C

METHOD OF MAKING AND USING GRANULATED MICELLE-CLAY COMPLEXES FOR REMOVAL OF POLLUTANTS FROM WATER

FIELD OF THE INVENTION

This invention relates to a method of production of granulated complexes of micelles of organic cations with clay and their use for removal of chemical pollutants and microorganisms from water.

BACKGROUND OF THE INVENTION

In the text below reference is made to the following prior art documents:
(1) Carter, A. D. *Weed Res.*, 2000, 40, 113-122.
(2) Motzer, W. E. Environmental Forensics 2001, 2, 301-311.
(3) Urbansky, E. T. Environ. Sci. & Pollut. Res., 2002, 9, 187-192.
(4) Lagaly, G. In: Proc. of the 10$^{th}$ International Clay ConferencSurface and interlayer reactions. Churchman, G. J., Fitzpatrick, R. W. & Egglegton, R. A. Eds.; CSIRO Pub.: Melbourne, Australia, 1995; pp. 137-144.
(5) Xu, S.; Sheng, G.; Boyd, S. A. *Adv. Agron.* 1997, 59, 25-62.
(6) Mishael, Y. G.; Undabeytia, T.; Rytwo, G.; Papahadjopoulos-Sternberg, B. Rubin, B.; Nir, S. J. *Agric. Food Chem.* 2002, 50, 2856-2863.
(7) Polubesova, T.; Nir, S.; Zadaka, D.; Rabinovitz, O.; Serban, C.; Groisman, L.; Rubin, B. *Environ. Sci. Technol.* 2005, 39, 2343-2348.
(8) Polubesova, T.; Zadaka, D.; Groisman, L.; Nir, S. *Water Res.* 2006, 40, 2369-2374.
(9) Nir, S.; Zadaka-Amir, D.; Kartaginer, A.; Gonen. Y. *Appl. Clay Sci.* 2012, 67-68, 134-140.
(10) U.S. Pat. No. 8,361,325, Method and system for removal of inorganic pollutants from contaminated water. Inventors: Shlomo Nir (Mazkeret Batya, Ill.)
(11) Bitton, G. Wastewater Microbiology. New York: Wiley-Liss, 1994.
(12) Hwang, B; Mangus, P; Jaakkola J. J. K. *Amer J Epidemiol.* 2002; 156, 374-382.
(13) Knappett, P S K, Emelko M B, Zhuang J, McKay L D. *Wat Res* 2008; 42:4368-4378.

These prior art documents are relevant for understanding the state of the art in the field of the invention. The references will be referred to in the text by giving their serial numbers from said list. Whereas granulation of substances in the pharmaceutical industry is well established, the intended use of micelle-clay granules for optimal removal of chemicals and microorganisms from water required the determination of a particular procedure with a narrow range of conditions.

Pollution of groundwater and wells has become an environmental and economical hazard due to intensively irrigated agriculture and application of herbicides and pesticides over cultivated lands as well as waste spills within the catchment areas of the various hydrogeological basins (1).

Perchlorate anion ($ClO_4^-$), which is quite inert, is produced when salts of ammonium, or sodium perchlorate dissolve in water. One source of perchlorate in water arises from waste water of plants of solid rocket engine fuels. Another source is due to the use of certain fertilizers. At relatively large concentrations, perchlorate interferes with the body's iodine intake, causing disruption of thyroid gland functions (2, 3), although a safe daily exposure has not yet been agreed upon. Upper limits on perchlorate concentrations in drinking water in several states in USA (and Israel) vary between a few ppb and about twenty ppb. Regions in aquifers with perchlorate concentrations at 1000-fold higher than the above limit have been identified.

The adsorption of organic cations on clays partially transforms the clay-mineral surface from hydrophilic to hydrophobic (4, 5). The micelle-clay system is a relatively new innovation in which the structure includes a positively charged surface to a varying degree and a hydrophobic core (6,7). These characteristics were utilized in removing several organic pollutants (8,9) and in a patent (10) for removal of inorganic anionic pollutants, such as perchlorate from water.

One concern regarding water quality is minimizing the concentration of pathogenic microorganisms in water, thereby reducing the risk of an outbreak of waterborne diseases in humans or animals. A wide variety of enteric microbial pathogens may be found in wastewater (11). A number of bacterial pathogens which cause diseases such as dysentery, typhoid, and gastroenteritis have been transmitted primarily through untreated sewage irrigated vegetables.

Chlorination has been the main strategy for the disinfection of drinking water and wastewater, by inactivating pathogenic microorganisms. Alternative technologies have been evaluated because of the increasing concern over undesirable production of trihalomethanes (THMs), due to chlorination at high doses, whereas reduced efficiency in eliminating some epidemic microorganisms occurs at low doses (12).

Alternative means of disinfection include chloramines, chlorine dioxides, ozone and ultraviolet radiation, which also have several major disadvantages, such as the formation of carcinogenic by-products, residuals in treated water and reactivation of microorganisms after exposure. Since an ideal disinfection technique has not yet been found, combinations of several techniques are being used (12).

Enteric bacteria, viruses and protozoan parasites carry a negative surface charge (Knappett et al. 2008 13). Therefore, the system of positively charged micelle-clay complexes may be useful for the removal of organic pollutants and pathogenic microorganisms from water.

Filtration is the major procedure for removal of pollutants by adsorption. In order to enable flow in a filter, which includes a micelle-clay complex in powdered form it is needed to mix the complex with excess of granular material, such as sand, generally at a ratio of at least 19:1 w/w. This implies that such a filter includes just 5% of active ingredient, which necessitates frequent replacements. The present invention of granulation of the micelle-clay complex enables a free flow in a filter which includes exclusively the active ingredient.

SUMMARY OF THE INVENTION

The present invention is based on the finding that a granulated complex of micelles of an organic cation adsorbed on clay can efficiently and selectively adsorb certain organic, certain inorganic anionic pollutants, and certain microorganisms dissolved in contaminated water, and enable free flow in a filter filled with it. The use of a granulated rather than a powdered complex enables filling filters exclusively with the active component, thus enhancing the capacity per weight of the complex in comparison to the powdered complex, and reducing at least 20-fold the frequency of replacing the saturated filling.

In accordance with the present invention, the granulated complex of micelles of an organic cation adsorbed on clay can further comprise activated carbon for increasing efficiency of absorption of pollutants.

In the following, numerical values that are given should be understood as being approximations and represent a value with the range of 70% to 130% of the one indicated. Thus, for example, "0.2 mm" refers in fact to 0.14-0.26 mm.

Thus the present invention is directed to a method for obtaining an aqueous solution substantially free of inorganic anionic pollutants, such as perchlorate, organic pollutants, such as the herbicide sulfentrazone, and pathogenic microorganisms, comprising contacting the aqueous solution containing said pollutants with a granulated complex comprising micelles of an organic cation adsorbed on clay for removal of said pollutants from the aqueous solution.

The term "water" as used herein encompasses aqueous solutions. The aqueous solutions or "water" may be: water contaminated by industrial or domestic waste; affluent water; contaminated aqueous food products or raw material, e.g. contaminated milk, residual aqueous solution obtained after processing food, etc.

The term "water", other than if accompanied by a descriptor thereof, will be used to refer to the contaminants/pollutants-containing water. The term "purified water" will be used to denote water that has been purified by the inventive method or system.

The term "present" in the context of the invention refers to any manner in which pollutants or contaminants may appear in a liquid medium and includes solution, suspension, emulsion and presence as colloidal particles In the description herein the terms "pollutants" and "contaminants" will be used interchangeably.

The term (w/w) in certain of the examples means a ratio between the weight of one substance to that of another. Thus, a ratio (w/w) between an added granular material, such as sand and said complex of about 5:1 means that there are 5 weight units of sand for each 1 weight unit of said complex.

Said contacting may be in a continuous flow process in which the water is flown through or over said material. For that purpose at least one container containing said material is used. Said container may be a column containing said granulated complex, or a mixture through which the water is flown at a rate such as to permit the contaminants to be removed therefrom. Alternatively, contacting may be done in [or may be] a pool, tank or reservoir into which the water is continuously introduced and continuously removed at a rate such that the mean residence time of the water in the container is sufficient for the contaminants to be removed therefrom.

The ratio of the organic cation and the clay is typically about 0.3:1 to about 0.6:1 (w/w), preferably about 0.4:1 to about 0.6:1, most preferably about 0.41:1 to about 0.5:1.

As noted above, a typical example of a container is a column accommodating said granulated complex, or mixture. By one embodiment the column is entirely filled with said granulated complex, or mixture of two or more such complexes. In accordance with another embodiment, the column is partially filled with said mixture while other portions, typically at the column's bottom may be filled with another material or different mixture. It is also possible to prepare a column having alternate first and second types of layers, wherein the first layers contain said mixture and the second layers another material or different mixtures. A plurality of columns may be employed, which may be all the same or may be different.

The clay may be any aggregate of hydrous silicate particles less than 4 μm in diameter consisting of a variety of phyllosilicate minerals rich in silicon, aluminium oxides and hydroxides which include variable amounts of structural water. The clay may be chosen from sepiolite illite, and smectite, preferably it is chosen from a smectite, most preferably the clay is montmorillonite [(Na,Ca)$_{0.33}$(Al, Mg)$_2$Si$_4$O$_{10}$(OH)$_2$.nH$_2$O].

The organic cation is a cation having amphipathic properties, which is capable of forming micelles in an aqueous medium. The tendency of the organic cation to form micelles in an aqueous medium can be enhanced by increasing the concentration of salts in the medium. The micelles are essentially spherical structures wherein the hydrophobic (organic) part of the organic cation is in their interior and the ionic part faces the aqueous medium. The micelles adsorbed on the clay may comprise each several different organic cations or the clay may have adsorbed thereon different types of micelles, each of which has a different composition of organic cations.

Examples of preferred salts of organic cations are: a salt of ammonium cation of the type $X^+Y^-$ wherein $X^+$ is an $R''-N(R)_3$, R' being each independently a $C_{1-4}$alkyl group, an optionally substituted phenyl or an alkylphenyl group; R'' is $C_{12}$-$C_{20}$-alkyl preferably $C_{14}$-$C_{20}$-alkyl, most preferably $C_{16}$-$C_{20}$-alkyl and $Y^-$ is a counter ion chosen from Cl$^-$, Br$^-$ or OH$^-$. Preferably, R' is methyl, ethyl, propyl, pheny, benzyl and R'' is $C_{14}H_{29}$, $C_{15}H_{31}$, $C_{16}H_{33}$, $C_{16}H_{31}$, $C_{17}H_{35}$, $C_{17}H_{33}$, $C_{18}H_{37}$, $C_{18}H_{35}$, $C_{19}H_{39}$$C_{19}H_{37}$, $C_{20}H_{41}$, $C_{20}H_{39}$. The ammonium cation is characterized as having a low critical micelle concentration (CMC) of less than 1 mM. Consequently, in the complex of an organic cation adsorbed on clay, the organic cation is adsorbed as a micelle.

The pollutants which may be removed from water according to the invention are anionic inorganic pollutants, such as perchlorate, organic pollutants, such as the herbicide sulfentrazone, and microorganisms, such as bacteria, parasites such as *cryptosporidium*, and algae, such as chlorella. The present invention is further directed to a system for carrying out the methods described above. The system according to a preferred embodiment, intended for purifying water from the above pollutants comprises at least one container adapted to receive the polluted water and containing a granulated micelle-clay complex, a mixture of several such complexes, or a mixture of (i) a granular inert material, such as sand and (ii) a granulated complex comprising micelles of an organic cation adsorbed on clay. This container may be followed by another one including activated carbon or clay mixed with excess sand (1:100 w/w), which is intended to capture the residual released organic cation.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
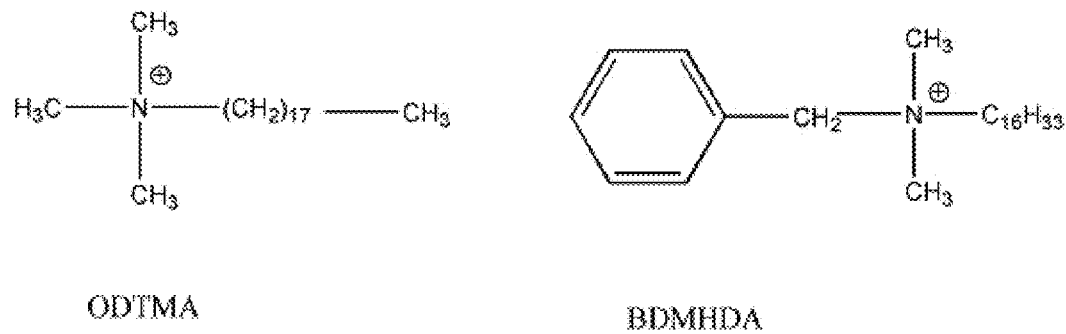
FIG. 1 shows the chemical structures of two organic cations forming micelles for forming micelle-clay complexes.

As mentioned, the present invention is directed to a complex of granulated micelle-clay complexes, optionally further comprising activated carbon, a method of preparing the complex, a method for purifying water from organic contaminants, anionic inorganic pollutants, and pathogenic microorganisms present therein and a system. The method and system for purifying polluted water may be done by letting the polluted water pass, e.g. flow through a purifying system, where use is made of pure granulated complexes or a mixture of such complexes with a granular material which may be contained in a container.

The container is preferably in the form of a column where the system may be formed of a single column or comprise two or more columns connected in series or in parallel by channels, pipes or any conduit enabling the flow (by gravity or by forced pumping) of water between them. While column is a preferred container type according to the invention, the invention is not limited thereto and other container types may be used. These include containers adapted for a batch-type purification process, such as open pools or basins, tanks, etc., with or without a water stirrer or agitator. For purification, the water is introduced and removed after a time sufficient for removal of the pollutants from the water by said mixture. These also include containers for a flow-based purification process in which the liquid is flown through or over said mixture, including columns, flow-through reservoirs or pools with inlet at one or more points and outlet at one or more other points situated such so as to ensure flow of water through or over said mixture in manner to permit removal of the contaminants from the water.

Columns may either be fully filled with said granulated micelle-clay complex, or a mixture of a granular material, such as sand and a complex comprised of micelles of organic cation adsorbed on clay mixture, and granulated, or the column may comprise also layers filled with different compositions.

The micelle-clay complex: the starting point may be a concentrated solution (several mM) of organic cations which include a large hydrophobic part and consequently have a very small critical micelle concentration (CMC), such as octadecyltrimethylammonium (ODTMA) which has an alkyl chain of 18 carbon atoms, CMC=0.3 mM. The micelles which carry a net positive charge adsorb on negatively-charged clay platelets, e.g., montmorillonite, forming aggregates. The micelles, which include several tens to about several hundred molecules, are in the nanometer range, whereas the clay platelets have a thickness of the order of a nanometer, and a typical area of the order of 1 $\mu m^2$.

As was shown in (6) and in a previous patent (10) on the powdered micelle-clay complex the adsorption of hexadecyltrimethylammonium (HDTMA) and ODTMA on montmorillonite occurs above and below their CMC. At added concentrations above the CMC, the loading exceeded the clay's cation exchange capacity (CEC) and indicated higher affinity of the cation with the longer alkyl chain. An adsorption model could adequately simulate organic cation adsorption at added concentrations below the CMC, and yield fair predictions for the effect of ionic strength (6).

The model calculations and experimental results (6) indicated that above the CMC, adsorbed micelles contributed significantly to the amount of ODTMA adsorbed. Evidence for adsorption of ODTMA micelles on montmorillonite was provided by freeze-fracture electron microscopy, X-ray diffraction, and dialysis bag measurements. Electron microscopy showed a high concentration of micelles in the size range of about 7 to 17 nm. ODTMA added inside a dialysis bag to a clay suspension outside the dialysis bag gave similar features of the clay particles as observed for clay alone.

In order to enable flow in a filter, the powdered micelle-clay complexes, such as ODTMA-clay, or BDMHDA-clay had to be mixed with excess of a granulated material, e.g., sand at a ratio of 19:1 w/w, or more. Below is a description of an optimized granulation procedure which enabled flow in a filter without addition of a granular material.

Granulation Procedure

Figure 2:
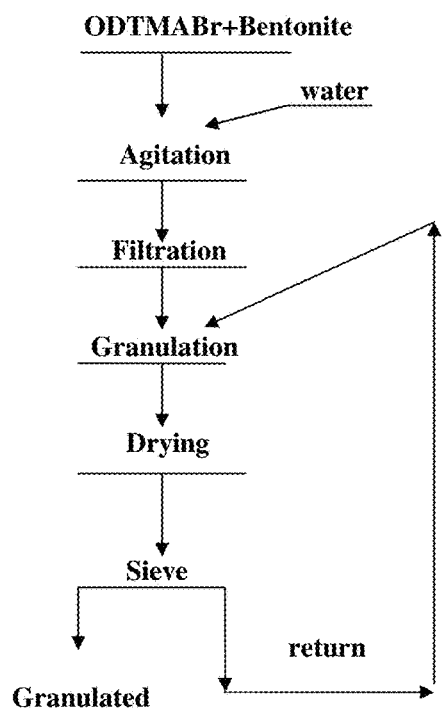
FIG. 2 shows a scheme for production of granulated micelle-clay complex.

The production method of granular micelle-clay complexes includes (see FIG. 2):
1. Mixing of the organic cation and clay in water which produces a micelle-clay complex.
2. Filtration of the pulp.
3. Granulation of the Cake filtrate.
4. Drying of granular micelle-clay.
5. Selection of particle size fractions of the micelle-clay granules Non limiting examples according to the present invention, octadecyltrimthyl-ammonium bromide (ODTMA Br), or chloride, ODTMA Cl, or benzyldimethyl-hexadecylammonium chloride (BDMHDA Cl) were used as the organic cation (surfactant) and bentonite (montmorillonite) was used as the clay.
1. Mixing of ODTMABr and Bentonite in Water.
1.1 The Temperature of the Mixing Process.

Figure 3:
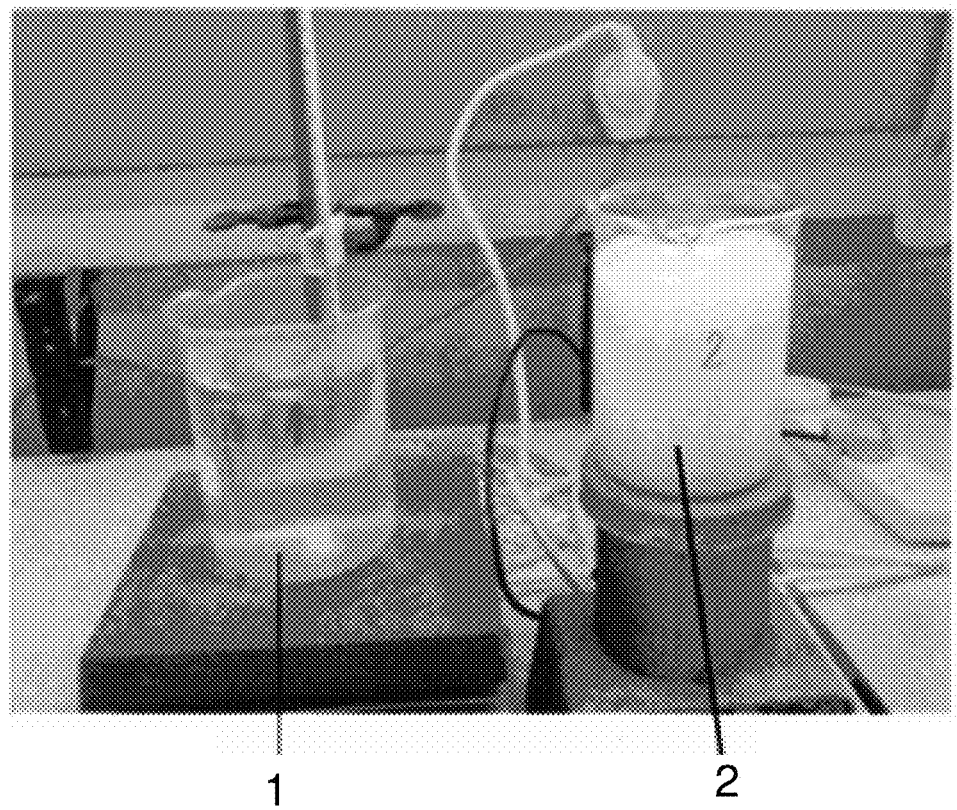
FIG. 3 shows solutions of ODTMABr at: 1. Temperatures of 40-45° C. and 2. Temperatures of 22-24° C.

The mixing process should be carried out at a temperature of not less than the critical micelle formation temperature, which for ODTMABr is 38-60° C. At this temperature a fast rate of ODTMABr dissolution in water and its interaction with the clay occur. FIG. 3 shows the appearance of ODTMABr solution at temperatures of 22-24° C. and 40-45° C. Mixing of ODTMABr and clay in water at temperature ranges of 22-24° C. and 40-45° C. Ratio (w/w) of ODTMABr:Clay was 32:68. The weights of solid in g/L were 25, 50, 100 and 200. Duration of dissolution of ODTMABr was 8 h at 22-24° C. and 1 h at 40-45° C.

Mixing times needed at the lower temperature range were 16 h for 25 and 50 g/L of solid, whereas at higher concentrations mixing was difficult. In contrast, 1 h was sufficient for mixing at the higher temperatures. Duration of thickening was 24 h at the lower temperatures for 25, 50 and 100 g/L, whereas the corresponding times at the higher temperatures were 1, 2 and 4 h, respectively. For a concentration of 200 g/L thickening was difficult. Thus the results show that the largest possible solid content in water during complex formation is 200 g/L. The increase of solid content can disrupt mixing and the thickening process of micelle-clay.

The water contents in the cake were higher for incubation at lower temperatures, 65-70%, whereas at the higher temperatures the water contents were 45-50%.
1.2 The Ratio between the (ODTMABr) and Clay.

When the percentage of ODTMABr in a mixture with clay was 32% the absolute yield of the micelle-clay complex was optimal (Table 1).

TABLE 1

Effect of ratio between ODTMABr and clay on ODTMA content and yield. The amount of clay was 17 g.

| ODTMABr (g) | Clay + ODTMABr g | % ODTMABr | Micelle clay yield (g) | % | Content of ODTMABr in Micelle clay (g) | % |
|---|---|---|---|---|---|---|
| 6 | 23 | 28 | 20.0 | 86.8 | 3.0 | 13.0 |
| 8 | 25 | 32 | 21.85 | 87.4 | 4.85 | 19.0 |
| 10 | 27 | 37 | 23.6 | 87.4 | 6.6 | 24.0 |

TABLE 1-continued

Effect of ratio between ODTMABr and clay on ODTMA content and yield. The amount of clay was 17 g.

| ODTMABr (g) | Clay + ODTMABr g | % ODTMABr | Micelle clay yield (g) | % | Content of ODTMABr in Micelle clay (g) | % |
|---|---|---|---|---|---|---|
| 12 | 29 | 41 | 24.13 | 83.2 | 7.13 | 25.0 |
| 14 | 31 | 45 | 26.1 | 84.2 | 4.9 | 16.0 |

2. Filtration.

For filtration of the slurry after mixing, common processes and equipment (vacuum filters, pressure filters, centrifuges) were used.

Table 2 presents the results of filtration of the micelle-clay pulp.

TABLE 2

Efficiency of removal of water from slurry by several filters.

| Type of equipment | Thickness of the cake, mm | Solid content, % | Filtration, productivity, kg\hour × m$^2$ |
|---|---|---|---|
| Vacuum- Filter | 17-24 | 27-35 | 27-30 |
| Press- Filter | 25-30 | 45-50 | 35-40 |
| Centrifuge equipped with a filter cloth | 15-20 | 40-45 | 30-35 |

3. Granulation.

The material used for production of micelle-clay granules can be in one of the forms below:
Dry micelle-clay, after pulp drying.
Dry milled cake after application of drying and grinding.
Humid cake.

As an example, the results of the two-stage cake granulation process are shown.

The first stage yields particles without shape.
The second stage yields spherical granules or granules with special shapes.

An important parameter of the granulation process is the humidity of the material for granulation (see Table 3)

TABLE 3

Effect of solid content in the cake on the size distribution of granules.

| Size of granules, mm | Solid content in the cake, % | | | | |
|---|---|---|---|---|---|
| | 45-50 | 50-52 | 52-57 | 57-62 | 62-67 |
| >1.18 | 18-20 | 14-16 | 2.5-3.0 | 2.3-2.5 | 0.2-0.3 |
| 0.1-1.18 | 76.5-73 | 79.8-77.2 | 88.0-86.5 | 87.9-85.3 | 84.9-79.6 |
| <0.1 | 5.5-7 | 6.2-6.8 | 9.5-10.5 | 9.8-12.2 | 14.9-20.1 |
| Total | 100.0 | 100.0 | 100.0 | 100.0 | 100.0 |

4. Process of Drying of Granules.

In the process of drying of granules common methods of drying (heat, freeze, vacuum drying etc.) can be used. The drying temperatures of granular material are:

For the process of obtaining granules the temperature is up to 140° C.; for drying of ready granules: 60 to 120° C.

5. Attainment of Required Particle Size Fractions of Granulated Micelle-Clay.

For attainment of the required fractions of sizes of granulated micelle-clay particle sieving is used (employing common equipment, such as vibrating screens). The size of the sieve holes is dictated by the required particle sizes.

The granules, that are not the "finished product" (called "retur") are returned back for processing. They can be mixed with the filtration cake (with or without pre-crushing and pre-grinding).

6. "Retur" Grinding (Crushing)

Common types of equipment for crushing and grinding of "retur" can be impact mill, pin mill, etc.

Removal of Perchlorate from Water by a Small Pilot Filter Filled with Granulated ODTMA-Montmorillonite A pilot for removal of perchlorate was set up in the area of the campus of the University at Rehovot. The Pilot filter was a cylindrical column filled with granules of the complex octadecyltrimethyl ammomium (ODTMA) at a height of 170 cm and diameter of 10 cm. The filter included 10.6 kg of granules whose diameters varied between 0.5 to 2 mm. The filter was preceded with a prefilter filled with sand for removing abundant rust particles from the tap water. A peristaltic pump fed the water from a 1 m$^3$ container. The container was manually covered on its external sides by a reflective paper-metal to prevent growth of algae. The water included an average of 1170 ppb of perchlorate and the average flow rate was 540 mL/min, which corresponds to 4.2 m/h. This perchlorate concentration exceeded by 40% the concentration of perchlorate at a well in near Rehovot, where a previous pilot was set up several years ago (10) with powdered ODTMA-clay mixed with excess sand at 1:19 w/w ratio. The water included a large excess of other inorganic anions, such as chloride (160 ppm) sulphate 40 ppm, nitrate 50 ppm. The operation continued for 5 months, with an occasional interruption for 2 days due to technical problems of accumulation of rust, change of pipes, etc. The overall volume passed was 103 m$^3$.

The experimental and calculated values of perchlorate concentrations are given in Table 4. The experimental results were in fact predicted by model calculations described by Equation (1) below, which considers adsorption and desorption according to the Langmuir formalism, and convection, which is presented and solved numerically for filtration of a solution which includes several pollutants (9), $$dC(X,t)/dt = -v \partial C/\partial X - C_1 \cdot C(X,t) R(X,t) + D_1 (R_o - R(X,t)) \quad (1)$$

It pertains to a column of length L filled with material whose initial molar concentration of adsorbing sites is $R_o$, whose concentration changes later to $R(X,t)$. The beginning and end of the filter are at the coordinates X=0 and X=L, respectively. We consider that the pollutant concentration at the inlet, $C_o$ is constant i.e., $C(X,t)=C_o$, X≤0, where t denotes time.

The parameters used were deduced from analysis of previous laboratory studies.

It follows that the capacity of the micelle-clay granules to reduce the concentration of perchlorate by filtration to less than 4 ppb amounts to at least 32 m$^3$ per 1 kg of ODTMA, or 10 m$^3$/per 1 kg of the complex. For an emerging perchlorate concentration of 15 ppb the capacity is 11 m$^3$ per 1 kg of the complex.

During the pilot, a development of an analytical procedure (by Dr. Julius Ben-Ari) employing a partially deuterated ODTMA as a reference in measurements by LC MS enabled to measure the concentration of released ODTMA during filtration. The request of Israeli Health Ministry is that the concentration of ODTMA in water filtered for drinking should be below 100 ppb. This request was satisfied as demonstrated by the results in Table 5. It should be mentioned that the release is significantly higher for the first 1% of the filtered water. At any rate, we have tested that a layer (20 cm) of montmorillonite mixed with excess sand (1:100, w/w), or activated carbon could lower the concentration of released ODTMA below 1 ppb.

TABLE 4

Emerging Perchlorate concentrations in Pilot experiment

| Volume m$^3$ | Perchlorate ppb (exp.) | Calculated |
|---|---|---|
| 67.0 | 2 | <0.1 |
| 85.0 | 2 | <0.1 |
| 88.0 | 2 | <0.1 |
| 91.5 | 1 | <0.1 |
| 103.0 | 2 | 0.3 |

The estimated experimental error was 2-4 ppb. The parameters employed in the calculations were: $R_0=1$ M; $C_1=40$ M$^{-1}$ min$^{-1}$, $D_1=0.0013$ Min$^{-1}$.

The conclusion from the pilot is that the employment of the micelle (ODTMA)-montmorillonite granulated complex enables to purify efficiently well water (about 1 ppm) from perchlorate at a large scale of several hundred thousand (or millions) cubic meters to a final value of several ppb.

TABLE 5

Released ODTMA in Pilot experiment

| Volume m$^3$ | Concentration of released ODTMA (ppb) |
|---|---|
| 15.6 | 25.0 |
| 19.8 | 39.3 |
| 30.0 | 30.2 |
| 103.0 | 49.0 |

Removal of the Anionic Herbicide Sulfentrazone by Filters Including Granulated Micelle-Clay Complexes The average concentration of sulfentrazone in the initial solution was 98.6 ppm. The flow rate was 453 mL/h, which amounted to a total filtered volume of 3.62 L in 8 h by each system. Each system included two column filters in series, each of which included a mixture between 6.5 g of granulated micelle-clay complex and excess sand at a ratio of 1:10. Tables 6 and 7 describe the average outcome (of duplicates) of filtration by columns which included the granulated complexes BDMHDA- or ODTMA-clay, respectively. Calculations as in Nir et al. (2012) were employed to simulate the results.

The results indicate that for the first BDMHDA column the emerging sulfentrazone concentrations varied between 0.7 to 38.5 ppm, which amounts to experimental percents of removal between 99.3 and 61. The second column yielded percents of removal between 99.9 and 99.3.

Table 7 indicates that the ODTMA including filter was significantly more efficient in removing sulfentrazone than the BDMHDA one. In this case the first column yielded removal percents between 99.5 and 94.2, whereas within the experimental sensitivity it can only be stated that the percents of removal by the second column were at least 99 in all cases.

For both systems the calculations yielded good simulations and predictions by using the values of the kinetic parameters C1=30M$^{-1}$ min$^{-1}$ and D1=2.10$^{-4}$ min$^{-1}$. The molar concentrations of the binding sites were 0.078 and 0.13 for BDMHDA and ODTMA, respectively. It can be noted that the value of Cl was 4-fold smaller than the value employed in Nir et al. (2012) for analysis of sulfentrazone removal by filters which included a powdered BDMHDA-montmorillonite. In the latter article it was estimated that for a 1:19 w/w mixture of a powdered BDMHDA-montmorillonite complex with sand, and a 2 m long filter, 1 kg of the cation could reduce by 90% the concentration of the emerging herbicide from a 1 ppm solution for a volume of 49 m$^3$, which amounts to a purification of 15 m$^3$ by 1 kg of the complex. The granulated complex would yield a smaller capacity under similar conditions for a 1:19 mixture of granules with sand. However, the granulated complex can sustain flow without addition of sand. When the same filter is filled exclusively with the BDMHDA-based complex, it turns out that 1 kg of the complex can reduce the initial concentration of sulfentrazone from 1 ppm to 0.1 ppm from 37 m$^3$. Hence, the use of the granulated BDMHDA-montmorillonite amounts to a significant enhancement in the capacity, and 20-fold reduction in the frequency of replacement of the filters. For a filter which includes ODTMA the capacity is larger, 52 m$^3$ per kg of complex for 90% removal from a 1 ppm solution of sulfentrazone, whereas one kg of the complex can yield 99.9% removal from 35 m$^3$.

TABLE 6

Removal of sulfentrazone by two column filters which included each 6.5 g of granulated micelle (BDMHDA)-clay complex mixed with excess sand.

| Time | Col I Emerg. sulfent. | Col I % Removal | | Col II Emerg. sulfent. |
|---|---|---|---|---|
| (h) | (ppm) | Exp. | Calc. | (ppm) |
| 1 | 0.7 | 99.3 | 97. | 0.1 |
| 2 | 5.9 | 94.1 | 95.2 | 0.2 |
| 3 | 10.8 | 89.2 | 92.5 | 0.3 |
| 4 | 16.6 | 83.3 | 89.7 | 0.31 |
| 5 | 22.7 | 77. | 83. | 0.37 |
| 6 | 27.4 | 73. | 76. | — |
| 7 | 33. | 67. | 66.3 | 0.52 |
| 8 | 38.5 | 61. | 55.5 | 0.69 |

$^a$ The flow rate was 7.55 mL/min. The volume filtered per hour was 453 mL. The length of the active layer in a single column was 19 cm, and the inner diameter was 1.6 cm, which corresponded to a cross sectional area of 2 cm$^2$. The parameters used in the calculations were $R_0$ = 0.078M, C1 = 30 M$^{-1}$min$^{-1}$ and D1 = 2 · 10$^{-4}$ min$^{-1}$. The fit of calculated to experimental values of percent removal yielded RMSE = 3.3, and R$^2$ = 0.95.

TABLE 7

Removal of sulfentrazone by two column filters which included each 6.5 g of granulated micelle (ODTMA)-clay complex mixed with excess sand.

| Time | Col I Emerg. sulfent. | Col I % Removal | | Col II Emerg. sulfent. |
|---|---|---|---|---|
| (h) | (ppm) | Exp. | Calc. | (ppm) |
| 1 | 0.46 | 99.5 | 99.7 | 0.1 |
| 2 | 0.67 | 99.3 | 99.6 | 0.2 |
| 3 | 0.74 | 99.2 | 99.3 | 0.3 |
| 4 | 1.2 | 98.8 | 98.9 | 0.31 |
| 5 | 2. | 98. | 98.3 | 0.37 |
| 6 | 2.9 | 97. | 97.4 | — |
| 7 | 4.4 | 95.5 | 96. | 0.52 |
| 8 | 5.74 | 94.2 | 93.8 | 0.69 |

$^a$ The flow rate was 7.55 mL/min. The length of the active layer in a single column was 19 cm, and the inner diameter was 1.6 cm, which corresponded to a cross sectional area of 2 cm$^2$. The parameters used in the calculations were $R_0$ = 0.13M, C1 = 30 M$^{-1}$min$^{-1}$ and D1 = 2 · 10$^{-4}$ min$^{-1}$. The fit of calculated to experimental values of percent removal yielded RMSE = 0.3, and R$^2$ = 0.97.

Removal of E-coli S-17 Bacteria by Filtration

Tables 8A and 8B below demonstrate removal of *E-coli* S-17 bacteria by columns which included granulated micelle-clay complexes mixed with sand. The mixing with sand was not for the purpose of facilitating the flow, but rather to shorten somewhat the duration of the experiment for adsorbing a large number of bacteria per unit weight of the complex.

Table 8A. The flow of bacterial solutions through the columns proceeded for 35 hours. The experimental setup included a duplicate of two systems, where each system was comprised of two columns in series, each of which included either 4 g of BDMHDA-montmorillonite, or ODTMA-montmorillonite.

The flow rate was 2 mL per min, 120 mL per hour. This flow rate corresponds to a flow velocity of 126 cm/h. However, it should be recalled that an 8-fold increase of the filter length to 168 cm would enable to increase the flow velocity to 10 m/h and have at least the same or larger number of bacteria adsorbed per unit weight. Furthermore, an increase of the complex concentration in the filter by avoiding mixing of the complex with sand will also enable to enhance the flow velocity and capacity. The results for the BDMHDA filter were that no bacteria emerged through any of the filters. In the case of the ODTMA containing filter Table 8 demonstrates that after 6 h of operation, no bacteria could be found in the purified water throughout the passage of 36 bed volumes through the filter, which amounts to entry of $3.6 \times 10^9$ bacteria into the first filter in each system. After 35 hours the number of emerging bacteria, 1000/mL corresponds to 5000-fold reduction in the number of bacteria in the emerging solution.

The total number of bacteria retained in the first filter of each set was $2.1 \times 10^{10}$. In this respect an emergence of a small fraction of bacteria through the ODTMA filter does not make a difference in the amount retained per filter. The number of bacteria retained per 1 g of complex was $5.2 \times 10^9$ both for BDMHDA-, or ODTMA-clay granulated complexes. This amounts to at least to $5.2 \times 10^{12}$ bacteria per 1 kg of a granulated complex. These results also demonstrate that the BDMHDA-montmorillonite is superior for purification of water from *E-Coli* bacteria, albeit both granulated complexes are very efficient.

TABLE 8A

Removal of *E-coli* S-17 bacteria by two filters in series, which included micelle-clay granulated complexes BDMHDA-, or ODTMA-montmorillonite.[a]

| Volume of Solution passing through filter (mL) | Number of bacteria retained in the first filter | Number of bacteria per mL, which emerge from the first BDMHDA filter | Number of bacteria per mL, which emerge from the second BDMHDA filter |
|---|---|---|---|
| 60 | $0.6 \times 10^9$ | 0 | 0 |
| 360 | $1.8 \times 10^9$ | 0 | 0 |
| 720 | $3.6 \times 10^9$ | 0 | 0 |
| 2160 | $1.08 \times 10^{10}$ | ND | 250 |
| 2880 | $1.44 \times 10^{10}$ | 1100 | 1230 |
| 3240 | $1.62 \times 10^{10}$ | 730 | 1050 |
| 4200 | $2.1 \times 10^{10}$ | 330 | ND |

[a] The columns had an inner diameter of 1.1 cm and a length of 21 cm. The flow rate was 2 mL/min. Each column included 4 g of granulated BDMHDA-montmorillonite, or ODTMA-montmorillonite complex, mixed with 25 g of sand. The solutions included $5 \times 10^6$ bacteria per mL.

In Table 8B two systems were used, each consisting of two columns in series. In each column the active layer was 20 cm long and the diameter was 5 cm. Each column included 27 g of granulated micelle (BDMHDA)-clay complex mixed with 635 g sand. The flow rate was 50 mL/min. The concentration of bacteria was $3.3 \cdot 10^6$ per mL.

Regeneration was achieved by passing 2 L of 0.1% NaOCl solution followed by 2 L of tap water. Then 136 L of bacterial suspension were filtered again. No bacteria emerged during the first 94 L. A similar outcome has resulted after a second regeneration.

TABLE 8B

Removal of *E-coli* S-17 bacteria by two filters in series, which included micelle-clay granulated complexes BDMHDA- montmorillonite.[a]

| Volume of Solution passing through filter (L) | Number of bacteria emerging per mL from the first filter (I) and second filter (II) | Experimental percent removed | Calculated percent removed |
|---|---|---|---|
| 76 | Column I. 0 | 100 | 99.9 |
|  | Column II. 0 | 100 | 100 |
| 94 | Column I. 18,300. | 99.5 | 99.6 |
|  | Column II. 834. | 99.97 | 100 |
| 127 | Column I. 233,000. | 96.9 | 96.1 |
|  | Column II. 75,300. | 99.6 | 100 |
| 136 | Column I. 105,000. | 93. | 92.9 |
|  | Column II. 13,300. | 97.7 | 100 |

[a] $R_0 = 5.8 \cdot 10^{-12}$ M; $C_1 = 9.5 \cdot 10^{11}$ M$^{-1}$min$^{-1}$; D1 = $10^{-4}$ min$^{-1}$.

Improved Removal of Perchlorate and Bacteria by a Small Addition of Activated Carbon During Preparation of the Granulated Complex Bentonite-ODTMA A small fraction of powdered activated carbon (Norit, The Netherlands) was added during the preparation of the complex. The focus in Table 9 is on addition of 9% of activated carbon at the expense of the clay during the incubation stage. Similar results, slightly less optimal were obtained when activated carbon was added to the cake.

I. Tests on Perchlorate Removal.

These tests, which are summarized in Table 9 compare perchlorate removal by a filter column which included granulated complexes with or without added powdered activated carbon (9%).

In each filtration experiment with a complex which included activated carbon a parallel control was a complex without activated carbon. The results in Table 9 demonstrate that incorporation of powdered activated carbon during preparation of the granulated complex bentonite-ODTMA yielded significantly better removal of perchlorate, i.e., lower emerging perchlorate in the filtered water both after the passage of 16.2 L and 18 L.

TABLE 9

[a] Emerging Perchlorate concentrations in laboratory experiments with granulated ODTMA-montmorillonite complex: effect of small addition of activated carbon during complex preparation.

| Volume (L) | Emerging Perchlorate (ppb) without activated carbon | Emerging Perchlorate (ppb) with activated carbon | Number of cases |
|---|---|---|---|
| 16.2 | 44 ± 10 | 10 ± 4 | 18 |
| 18.0 | 81 ± 10 | 18 ± 5 | 2 |

[a] The filter columns were 5 cm in diameter and 20 cm in length and included 13 g of the granulated complex mixed with 640 of sand. The perchlorate concentrations were 2000 ppb before filtration and the flow rate was 30 mL per min. Average values of emerging perchlorate concentrations are presented.

The conclusion from both cases is that addition of a small fraction of a powdered activated carbon during the granulation procedure is advantageous.

II. Tests on Removal of Bacteria

These tests, which are summarized in Table 10 compare removal of bacteria from tap drinking water by a filter column which included granulated complexes with or without added powdered activated carbon (9%).

As in Table 9, in each filtration experiment with a complex which included activated carbon a parallel control was a complex without activated carbon. The results in Table 10 demonstrate that incorporation of powdered activated carbon during preparation of the granulated complex bentonite-ODTMA yielded significantly better removal of bacteria from tap water, i.e., lower counts of emerging bacteria in the filtered water.

TABLE 10

[a] Emerging concentrations of bacteria (total count) by filtrating tap water in laboratory experiments with granulated ODTMA-montmorillonite complex: effect of small addition of activated carbon during complex preparation.

| Volume (L) | Emerging bacteria from a filter without activated carbon | Emerging bacteria from a filter with activated carbon |
|---|---|---|
| 185 | 2 | 0 |
| 272 | 500 | 100 |

[a] The filter columns were 5 cm in diameter and 40 cm in length and included the granulated complex at amounts of 40 g mixed with 960 g of sand. The flow rate was 40 mL per min. Total emerging bacterial count was per volume of 150 μL.

The invention claimed is:

1. A complex in granulated form comprising micelles of organic cation adsorbed on clay prepared by a method comprising:
   a. attaining complete dissolution of an organic cation or its salt in water at a temperature between 38° C. and 60° C. to obtain a micelle suspension;
   b. mixing the micelle suspension of (a) with clay added during 1 hour to the suspension, to obtain a micelle:clay mixture in the range of 1:3 to 3.7:6.5 (wt/wt);
   c. filtering to produce a cake having a solid content of 52-57%;
   d. granulating;
   e. drying the granules to reach a water content of 1 to 3% at a temperature of 55-60° C.; and
   f. sieving the granules to obtain particles having a diameter of 0.1 to 2 mm.

2. The complex according to claim 1, wherein the clay is an aggregate of hydrous silicate particles having a diameter of less than about 4 μm.

3. The complex according to claim 1, wherein the clay is selected from the group consisting of kaolinite-serpentine, illite, and smectite.

4. The complex according to claim 1, wherein the organic cation is an ammonium cation of the type $X^+Y^-$ wherein $X^+$ is an $R''$—$N(R')_3$, R' being each independently a $C_{1-4}$ alkyl group, an optionally substituted phenyl or an alkylphenyl group; R" is $C_{12}$-$C_{20}$-alkyl, preferably $C_{14}$-$C_{20}$-alkyl, most preferably $C_{16}$-$C_{20}$-alkyl, and $Y^-$ is a counter ion.

5. The complex according to claim 1, further comprising activated carbon in an amount of about 3%-12%, preferably 9%.

6. The complex according to claim 5, wherein the amount of the activated carbon being part of the total amount of the clay.

7. The complex according to claim 1, wherein the ratio of the organic cation and the clay is about 0.3:1 to about 0.6:1 (w/w), preferably about 0.4:1 to about 0.6:1, most preferably about 0.4:1 to about 0.5:1.

8. A method for obtaining an aqueous solution substantially free of organic, inorganic anionic pollutants, or microorganisms present therein, comprising contacting the aqueous solution containing said pollutants with the complex of claim 1 comprising micelles of organic cation adsorbed on clay in granulated form.

9. The method according to claim 8, wherein said complex further comprises activated carbon in an amount of about 3%-12%, preferably 9%.

10. The method according to claim 9, wherein the inorganic anionic pollutant is selected from the group consisting of perchlorate, cyanide and chromate, the organic pollutant is an herbicide, and the microorganisms are selected from the group consisting of bacteria, algae, or parasites.

11. The method according to claim 10, wherein the herbicide is sulfentrazone, the bacteria is *E-Coli*, the algae is *chlorella* and the parasite is *Cryptosporidium parvum*.

12. The method according to claim 8, wherein the ratio of the organic cation and the clay is about 0.3:1 to about 0.6:1 (w/w), preferably about 0.4:1 to about 0.6:1, most preferably about 0.4:1 to about 0.5:1.

13. The method according to claim 9 wherein the ratio of the organic cation and the clay is about 0.3:1 to about 0.6:1 (w/w), preferably about 0.4:1 to about 0.6:1, most preferably about 0.4:1 to about 0.5:1.

14. The method according to 13, wherein the amount of the activated carbon being part of the total amount of the clay.

15. The method according to claim 8, wherein the aqueous solution containing said pollutants is contacted with the complex comprising micelles of organic cation adsorbed on clay in granulated form, said complex being accommodated in a container adapted for its accommodation.

16. A system for obtaining an aqueous solution substantially free of organic, inorganic anionic pollutants, or microorganisms present therein, the system comprising at least one container adapted to receive the polluted aqueous solution and containing the complex of claim 1.

17. The system according to claim 16, wherein the container is a column.

18. The system according to claim 16, wherein the complex further comprises activated carbon.

19. The system according to claim 16, comprising two or more containers.

20. The method according to claim 8, comprising adding into the polluted water a complex comprising micelles of organic cation adsorbed on clay in granulated form.

21. The method according to claim 20, comprising allowing sedimentation of said complex and removing the sediment.

22. A complex in granulated form comprising granules of clay having micelles of organic cation adsorbed thereon, the granules having a water content of 1 to 3% and having a particle size of 0.1-2 mm diameter.

23. A method for making a complex in granulated form comprising micelles of organic cation adsorbed on clay, comprising:
   a. attaining complete dissolution of an organic cation or its salt in water at a temperature between 38° C. and 60° C. to obtain a micelle suspension;
   b. mixing the micelle suspension of (a) with clay added during 1 hour to the suspension, to obtain a micelle:clay mixture in the range of 1:3 to 3.7:6.5 (wt/wt);
   c. filtering to produce a cake having a solid content of 52-57%;
   d. granulating;

e. drying the granules to reach a water content of 1 to 3% at a temperature of 55-60° C.; and f. sieving the granules to obtain particles having a diameter of 0.1 to 2 mm.

* * * * *